United States Patent
Khoroushi (10) Patent No.: US 9,796,300 B1
(45) Date of Patent: Oct. 24, 2017

(54) SYSTEMS AND METHODS FOR CONVERTING JUMP SEATS INSIDE OF VEHICLES TO BENCH SEATS

(71) Applicant: Alpine Armoring, Inc., Herdon, VA (US)

(72) Inventor: Fred Khoroushi, Herndon, VA (US)

(73) Assignee: Alpine Armoring, Inc., Herndon, VA (US)

( * ) Notice: Subject to any disclaimer, the term of this patent is extended or adjusted under 35 U.S.C. 154(b) by 231 days.

(21) Appl. No.: 14/876,202

(22) Filed: Oct. 6, 2015

(51) Int. Cl.
*B60N 2/02* (2006.01)
*B60N 2/30* (2006.01)

(52) U.S. Cl.
CPC ......... *B60N 2/0292* (2013.01); *B60N 2/3009* (2013.01); *B60N 2/3045* (2013.01)

(58) Field of Classification Search
CPC .. B60N 2/0292; B60N 2/3004; B60N 2/3009; B60N 2/3031; B60N 2/3045
USPC ..................................... 297/130, 335, 95, 94
See application file for complete search history.

(56) References Cited

U.S. PATENT DOCUMENTS

| | | | |
|---|---|---|---|
| 1,154,074 A | 9/1915 | Strong | |
| 4,138,150 A | 2/1979 | Bills | |
| 6,655,720 B2 | 12/2003 | Rampen | |
| 2012/0199695 A1* | 8/2012 | Isherwood | B64D 11/0691 244/118.6 |
| 2013/0249264 A1* | 9/2013 | Bertocchi | B60N 2/4802 297/337 |

FOREIGN PATENT DOCUMENTS

EP   0170116 A1 *  2/1986  ............... A47C 9/06

OTHER PUBLICATIONS

Plate-Mount Retractable Spring Plunger, Steel, with Lock Nose, L 2.13", 3.5-6.3 lb. Nose Force, McMaster-Carr, 2015, http://www.mcmaster.com/, 3 pages.

* cited by examiner

*Primary Examiner* — Milton Nelson, Jr.
(74) *Attorney, Agent, or Firm* — Brian S. Steinberger; Law Offices of Brian S. Steinberger, P.A.

(57) ABSTRACT

Seat devices, apparatus, systems and methods for converting vertical single jump seats into bench seats and vice versa, without removing and replacing the seats inside of vehicles, such as in trucks, vans, station wagons, sport utility vans (SUVs), and automobiles. The mechanisms allow for converting the vehicle seats from vertical to bench seats and vice versa without having to physically remove and install different seat arrangements within the vehicles. The conversion between the jump seats with vertical backs and bench seats uses the same seat components and parts. The conversion can take place in seconds and at most a few minutes without using tools.

19 Claims, 12 Drawing Sheets

SYSTEMS AND METHODS FOR CONVERTING JUMP SEATS INSIDE OF VEHICLES TO BENCH SEATS

FIELD OF INVENTION

This invention relates to vehicle seats, and in particular to devices, apparatus, seat systems and methods for converting vertical single jump seats into bench seats and vice versa, without removing and replacing the seats inside of vehicles, such as in trucks, vans, station wagons, sport utility vans (SUVs), and automobiles.

BACKGROUND AND PRIOR ART

Seating arrangements in the backs of vehicles such as trucks or vans is often limited to either or both fixed single seats or fixed bench seats. In order to change a vertical seat to a bench seat would require taking apart the seat to remove it from the vehicle followed by installing a different seat inside such as a bench seat. This amount of work and labor and time would not be desirable for changing out one type of seat arrangement for another. In addition a good amount of tools, such as but not limited to wrenches, pliers, screw drivers, and loose fasteners would have be to used which would also not be desirable.

Some vehicles allow for a bench seat or single seat to fold down to increase floor space. However, the back of the bench seat is being folded down, so that no back remains. As such the folding down bench or single seat also does not turn the bench into a single seat or turn a single seat into a bench seat. The user would still need to dismantle and remove the existing vertical seat to put in a bench seat with a back, and vice versa. As such, the work, labor, time tools and parts would not be desirable.

Thus, the need exists for solutions to the above problems with the prior art.

SUMMARY OF THE INVENTION

A primary objective of the present invention is to provide devices, apparatus, seat systems and methods for converting vertical single seats into bench seats and vice versa, without removing and replacing the seats inside of vehicles, such as in trucks, vans, station wagons, sport utility vans (SUVs), and automobiles.

A secondary objective of the present invention is to provide devices, apparatus, seat systems and methods for converting vertical single seats into bench seats and vice versa, inside of vehicles, such as in trucks, vans, station wagons, sport utility vans (SUVs), and automobiles, by using the same seat components and parts.

A third objective of the present invention is to provide devices, apparatus, seat systems and methods for converting vehicle vertical single seats into vehicle bench seats and vice versa, within minutes without needing tools, extra equipment, loose fasteners, such as screws, nuts, bolts, washers, etc., and the like.

A preferred embodiment of a seat conversion system for converting a vertical jump seat inside of a vehicle into a bench seat, can include a vertical frame adapted to attach to a floor surface inside of a vehicle, a first rectangular platform having a front side with a width and length, a rear side with an upper end and a lower end, the rear side being pivotally attached to the vertical frame, the front side adaptable for being used as a single jump seat inside of the vehicle when the first platform is in a horizontal orientation, a second rectangular platform having a front side with a width and length, a rear side with an upper end and a lower end, the front side width of the first platform being substantially identical to the front side width of the second platform, the front side length of the second platform being longer than the front side length of the first platform, the front side of the second platform adaptable for being used as a single seat back surface when the second platform is in a vertical orientation with the lower end of the second platform adjacent to the upper end of the first platform, and wherein the second platform is moveable from the vertical orientation to a horizontal orientation with the upper end is supported at a lower position on the vertical frame, and the lower end of the second platform is supported by a support member, the support member being horizontally spaced apart from the vertical frame so that the second platform in the horizontal orientation is used as a bench seat inside of the vehicle.

The hinge can include a pair of hinges, each attached to the vertical frame and to a portion of the rear end of the first platform, the hinges for allowing the first platform to pivotally move from the horizontal orientation to a folded orientation adjacent to the vertical frame.

The seat conversion system can further include a telescoping post under the first platform located between the pair of the hinges, the telescoping post having an extended position when the first platform is in the horizontal orientation and a retracted position wherein the first platform is in a folded orientation.

The telescoping post can include an upper end with a first pivot bracket attached to the rear side of the first platform and a lower end with a second pivot bracket attached to the floor surface inside of the vehicle.

The seat conversion system can further include a seat retainer bracket attached to the vertical frame, the seat retainer bracket positioned at a height above the floor surface, and a ledge as the support member, the ledge being spaced horizontally apart from both the seat retainer bracket and the vertical frame, the ledge positioned at an identical height above the floor surface as the seat retainer bracket, wherein the upper end and the lower end of the rear side of the second platform are supported by the seat retainer bracket and the ledge when the second platform is in the horizontal orientation when the second platform is used as a bench seat.

The seat retainer bracket can include a pair of seat retainer brackets attached to the vertical frame.

The seat conversion system can further include a fixed seat on the floor surface spaced apart from the vertical frame, wherein the ledge is an upper edge on the fixed seat.

The seat conversion system can further include a bracket mounting assembly for attaching the rear side of the second platform to the vertical frame when the second platform is in the vertical orientation.

The bracket mounting assembly can include a first bracket attached to the vertical frame, a second bracket attached to the rear side of the second platform, and a fastener for locking the first bracket to the second bracket when the second platform is in the vertical orientation.

The first bracket can include a horizontal member with bent ends that form a U shape, with the horizontal member attached to the vertical frame, and the second bracket includes flanges perpendicularly attached to the rear side of the second platform, wherein the flanges of the second bracket lock with the bent ends of the first bracket by the fastener.

The fastener can include a pair of spring loaded fasteners having a compressed position which locks the first bracket to the second bracket, and an extended position which allows the second bracket to separate from the first bracket.

The spring loaded fasteners can include knobs with stems having springs for holding the fasteners in the compressed position.

The seat conversion system can include an upper horizontal beam on the vertical frame, wherein the bracket mounting assembly is attached to the horizontal beam.

The seat conversion system can include a lower horizontal beam on the vertical frame, and a hinge on the lower horizontal beam for pivotally attaching the rear side of the first platform to the vertical frame.

The hinge can include a pair of hinges, each attached to the lower horizontal beam on the vertical frame and to a portion of the rear end of the first platform, the hinges for allowing the first platform to pivotally move from the horizontal orientation to a folded orientation adjacent to the vertical frame.

The seat conversion system can include a seat retainer bracket attached to the lower horizontal beam on the vertical frame, the seat retainer bracket positioned at a height above the floor surface, and a ledge spaced horizontally apart from both the seat retainer bracket and the vertical frame, the ledge positioned at an identical height above the floor surface as the seat retainer bracket, wherein the upper end and the lower end of the rear side of the second platform are supported by the seat retainer bracket and the ledge when the second platform is in the horizontal orientation when the second platform is used as a bench seat.

The seat retainer bracket can include a pair of seat retainer brackets attached to the lower horizontal beam on the vertical frame.

The seat conversion system can include a second vertical frame adapted to attach to the floor surface inside of a vehicle spaced apart from the first vertical frame, a third rectangular platform having a front side with a width and length, a rear side with an upper end and a lower end, the rear side being pivotally attached to the vertical frame, the front side adaptable for being used as a second single jump seat inside of the vehicle when the third platform is in a horizontal orientation, a fourth rectangular platform having a front side with a width and length, a rear side with an upper end and a lower end, the front side width of the third platform being substantially identical to the front side width of the fourth platform, the front side length of the fourth platform being longer than the front side length of the third platform, the front side of the fourth platform adaptable for being used as a single seat back surface when the fourth platform is in a vertical orientation with the lower end of the fourth platform adjacent to the upper end of the third platform, and wherein the fourth platform is moveable from the vertical orientation to a horizontal orientation with the upper end supported at a lower position on the second vertical frame, and the lower end of the fourth platform is supported by a second support member, the second support member being horizontally spaced apart from the second vertical frame member so that the fourth platform in the horizontal orientation is used as a second bench seat inside of the vehicle.

Further objects and advantages of this invention will be apparent from the following detailed description of the presently preferred embodiments which are illustrated schematically in the accompanying drawings.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

Figures 1A, 1B:
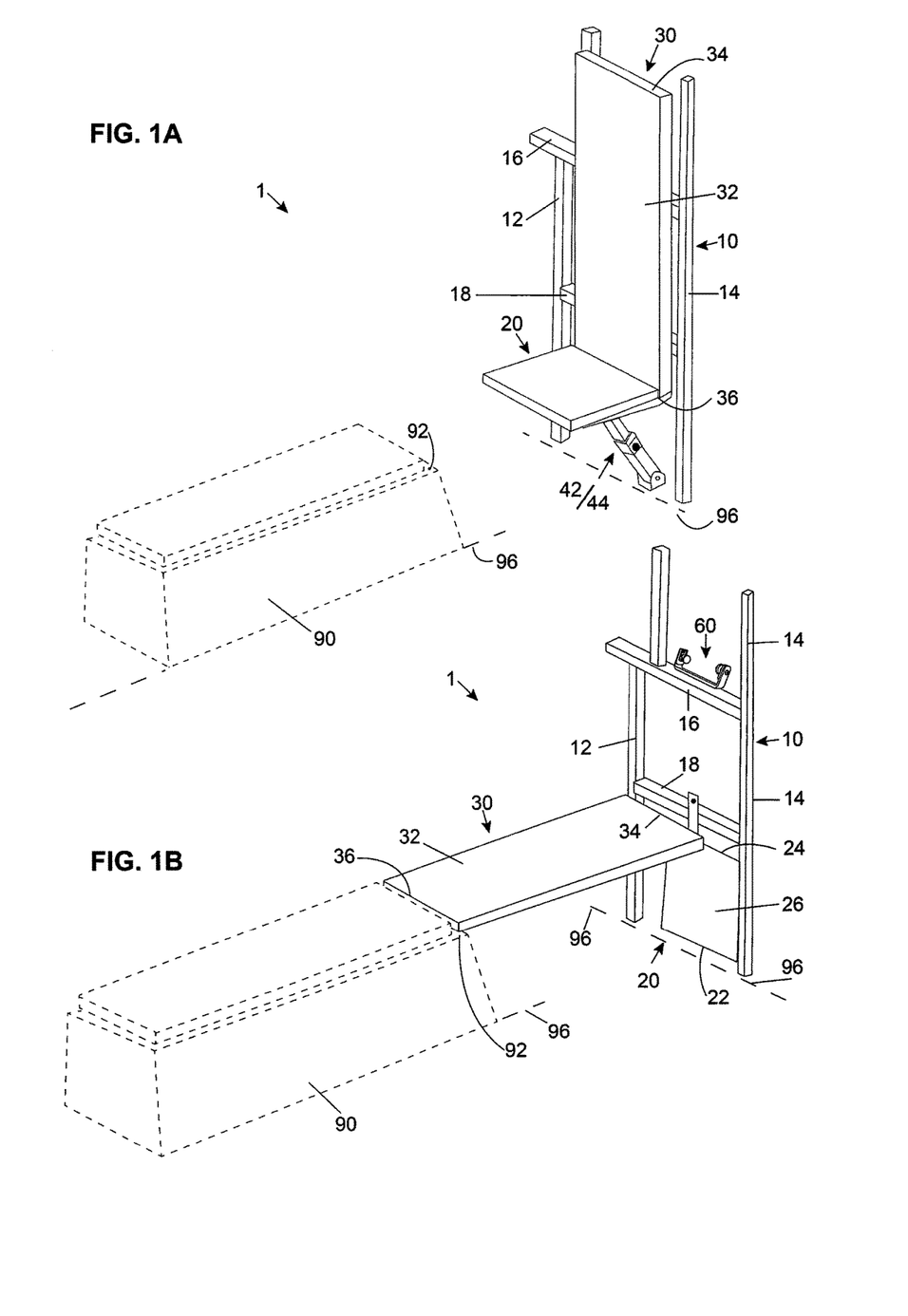
FIG. 1A is a perspective view of a seat conversion system with a first platform as the seat for a jump seat and a second platform as the back of the jump seat.
FIG. 1B is another perspective view of the seat conversion system of FIG. 1A second platform moved to be a bench seat.

A list of components will now be described.
1 First seat conversion system
10 First Vertical frame (mounted inside of a vehicle)
12 Left vertical leg
14 Right vertical leg
16 Upper horizontal beam
18 Lower horizontal beam
20 First platform (seating portion of jump seat)
22 Front end
24 Rear end
26 Top
28 bottom
30 Second platform (back rest of jump seat & bench seat)
32 Front side
34 Top end
36 Bottom end
38 Rear side
40 hinges for jump seat
42, 44 Telescoping members under jump seat
45 lock knob
46 Upper pivot bracket
48 Lower pivot bracket
50 first L bracket to support bench seat
56 second L bracket to support bench seat
58 hinge for second L bracket
60 Mounting bracket assembly
62 U-bracket
64 Horizontal member
66 Bent ends
70 First L bracket with perpendicular flange
74 Second L bracket with perpendicular flange
80 Spring loaded lock fasteners (2)
Each with knob and spring
90 Second seat inside of vehicle
92 Ledge on second seat (support for end of bench seat)
93 faster for bench edge (post(s), bolt(s))
95 sockets (openings) for fasteners
96 floor of vehicle
100 Second seat conversion system FIG. 1A is a perspective view of a seat conversion system 1 with a first platform 20 as the seat for a jump seat and a second platform 30 as the back of the jump seat that are initially mounted to a vertical frame 1 inside of a vehicle. The vehicle can be selected from trucks, vans, station wagons, sport utility vans (SUVs), and automobiles, which will be described later in regard to FIGS. 9A-9B.

Figure 2:
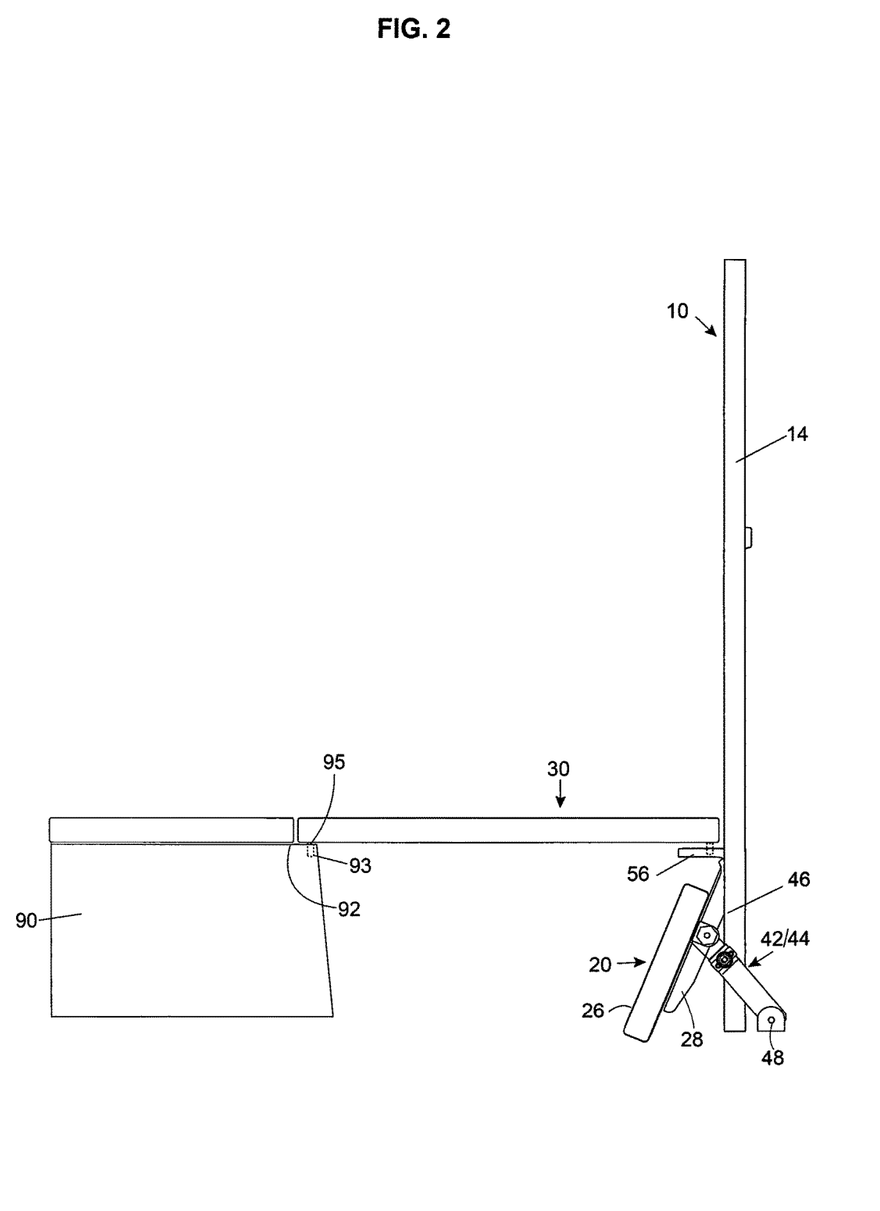
FIG. 2 is a side view of the seat conversion system of FIG. 1B with the bench seat supported by a vertical frame and a second seat.

FIG. 1B is another perspective view of the seat conversion system 1 of FIG. 1A with the second platform 30 moved to be a bench seat. FIG. 2 is a side view of the seat conversion system 1 of FIG. 1B with the bench seat 30 supported by a vertical frame 10 and a second seat 90 which can also be mounted inside of a vehicle.

Figure 3A:
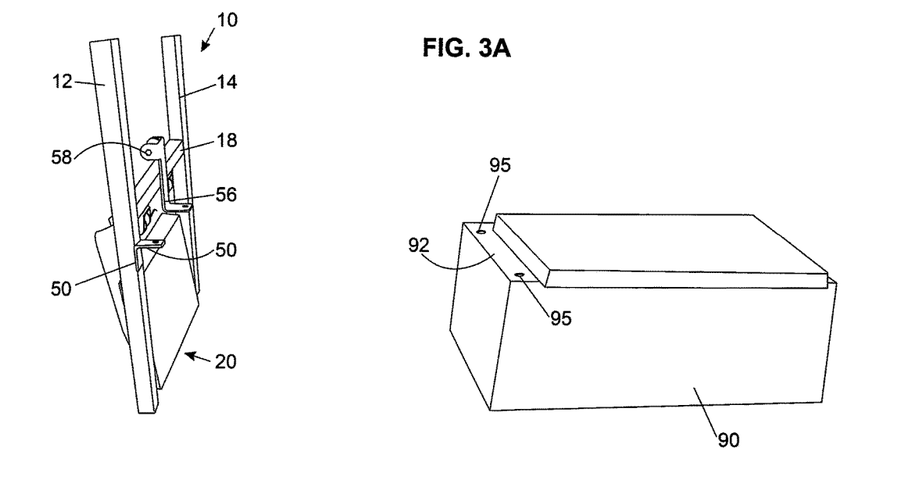
FIG. 3A is a side perspective view of the preceding FIGURES with the first platform folded against the vertical frame and the second platform removed.
Figure 3B:
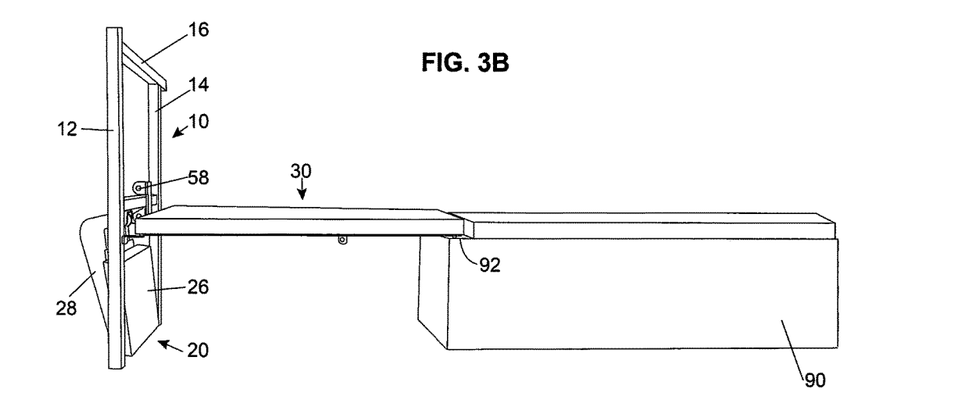
FIG. 3B is another perspective view of FIG. 3A with the second platform used as a bench seat supported by the vertical frame and the second seat.

FIG. 3A is a side perspective view of the preceding FIGURES with the first platform 20 folded against the vertical frame 10 and the second platform 30 removed. FIG. 3B is another perspective view of FIG. 3A with the second platform 30 used as a bench seat supported by the vertical frame 10 and the ledge 92 on the second seat 90.

Figure 4A:
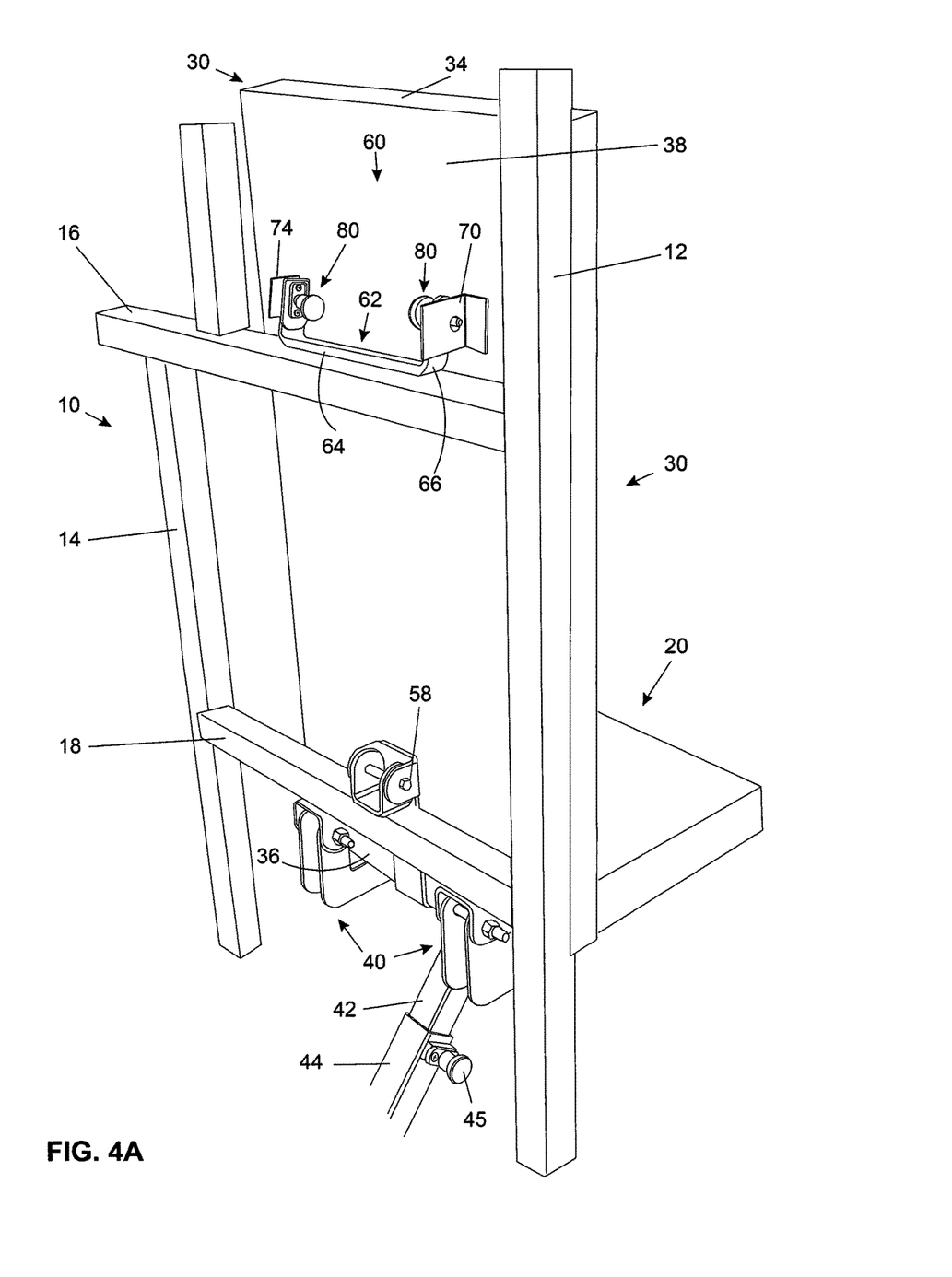
FIG. 4A is a rear perspective view of the first and second platforms of the preceding FIGURES attached to the vertical frame being used as a jump seat.
Figure 4B:
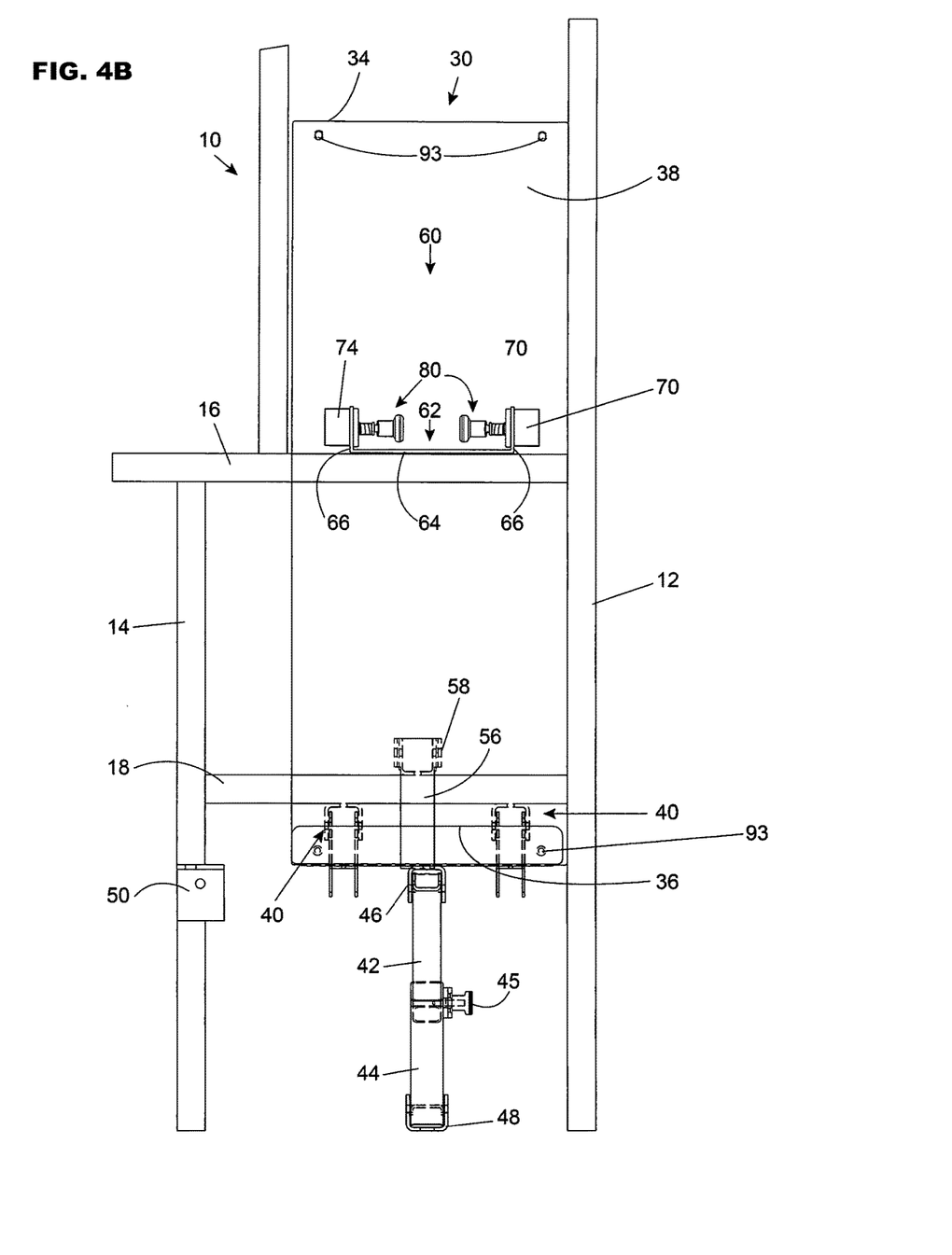
FIG. 4B is a rear view of the jump seat of FIG. 4A.

FIG. 4A is a rear perspective view of the first platform 20 and second platform 30 of the preceding FIGURES attached to the vertical frame 10 being used as a jump seat. FIG. 4B is a rear view of the jump seat (both 20, 30) of FIG. 4A.

Figure 5A:
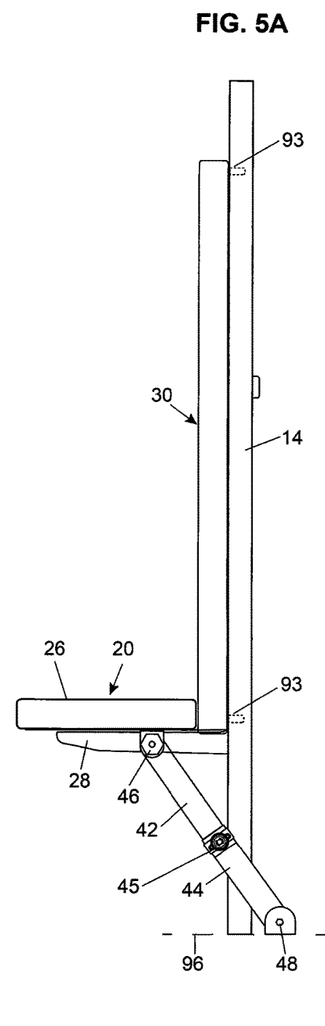
FIG. 5A is a side view of the first and second platforms and vertical frame of FIGS. 4A and 4B used as a jump seat.
Figure 5B:
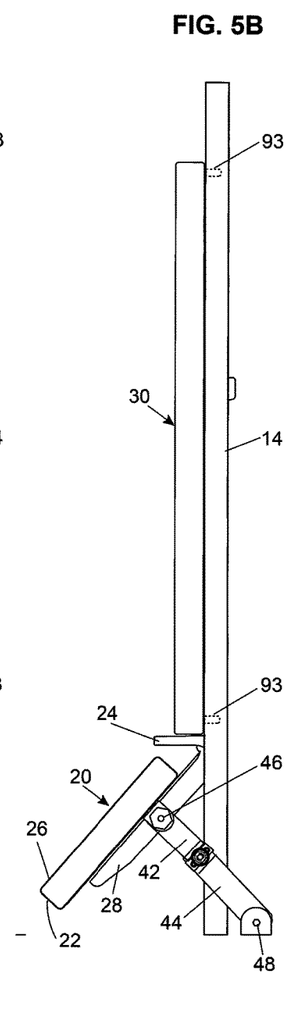
FIG. 5B is another side view of FIG. 5A with the seat portion starting to be folded against the vertical frame.
Figure 5C:
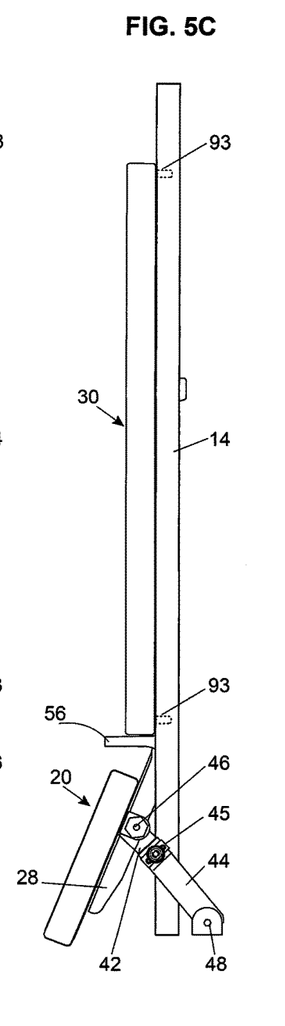
FIG. 5C is another side view of FIG. 5B with the seat portion in a folded position against the vertical frame.

FIG. 5A is a side view of the first platform 20 and second platform 30 and vertical frame 10 of FIGS. 4A and 4B used as a jump seat. FIG. 5B is another side view of FIG. 5A with the seat portion 20 starting to be folded against the vertical frame 10. FIG. 5C is another side view of FIG. 5B with the seat portion 20 in a folded position against the vertical frame 10.

Figure 6A:
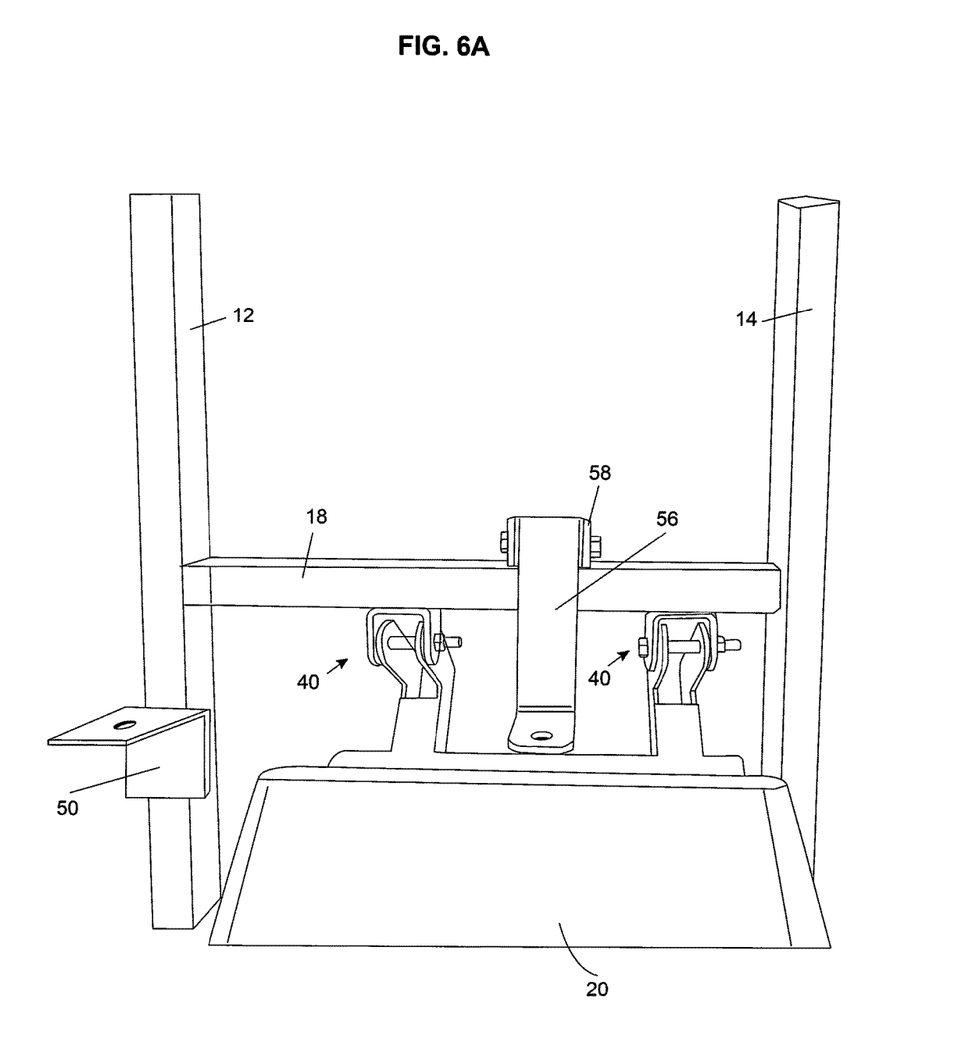
FIG. 6A is an enlarged front view of the hinges for the folding seat portion of FIG. 5B.
Figure 6B:
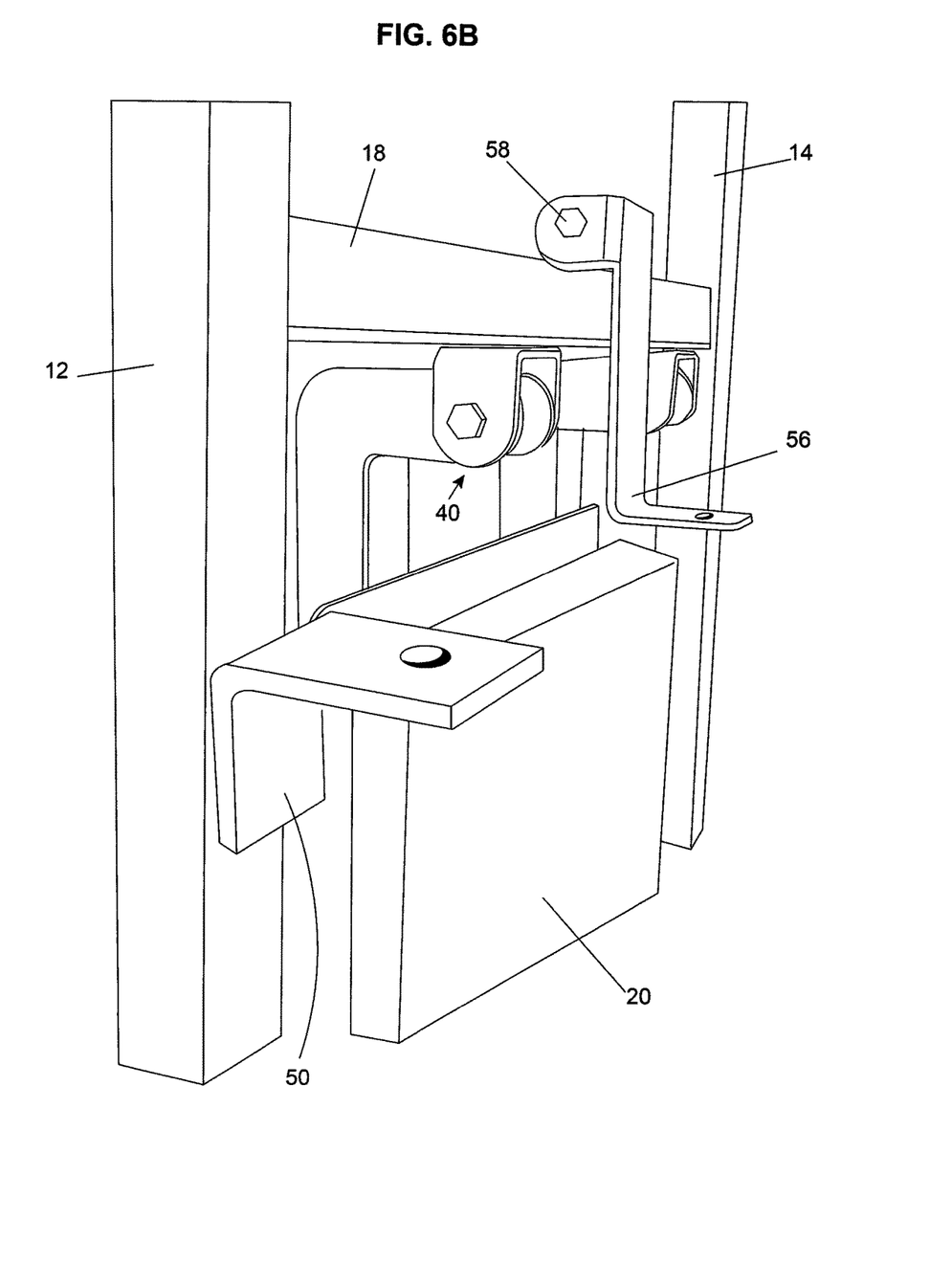
FIG. 6B is another enlarged view of the folding seat portion of FIGS. 5B and 5C.

FIG. 6A is an enlarged front view of the hinges 40 for the folding seat portion 20 of FIG. 5B. FIG. 6B is another enlarged view of the folding seat portion 20 of FIGS. 5B and 5C.

Figure 7:
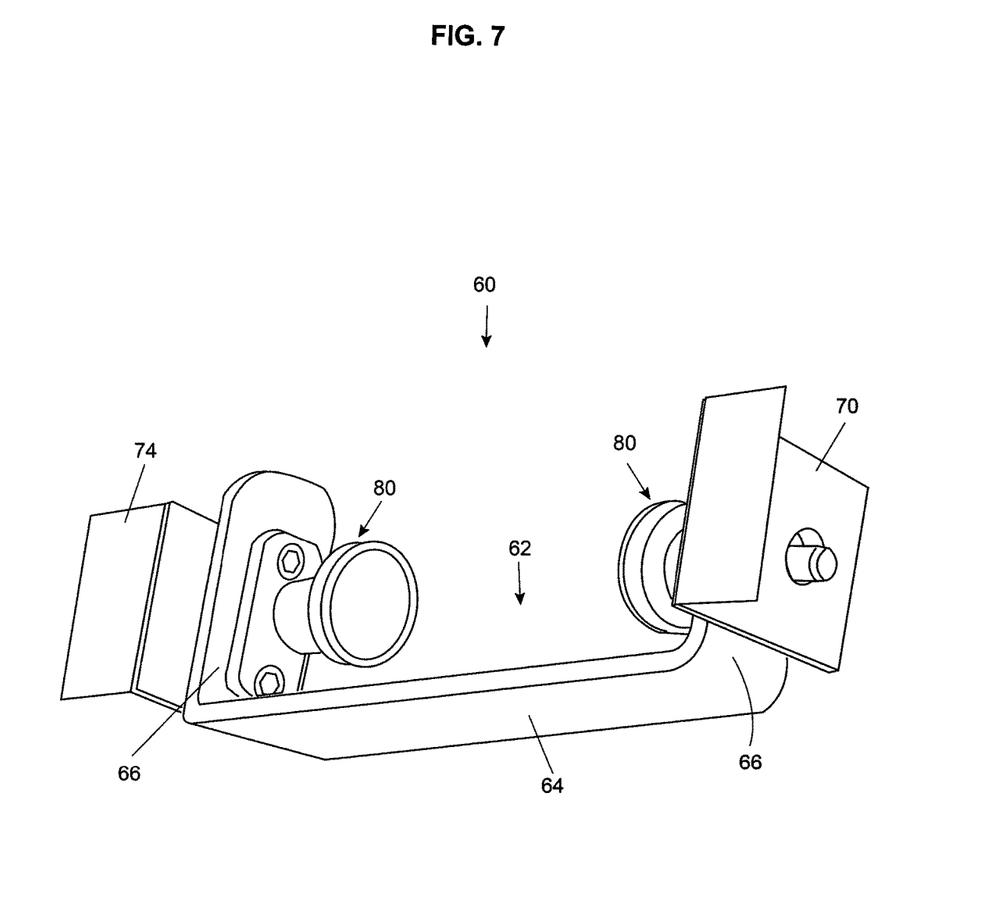
FIG. 7 is an enlarged perspective view of the mounting bracket assembly that attaches the rear side flanges of the second platform to the vertical frame in a lock position.
Figure 8A:
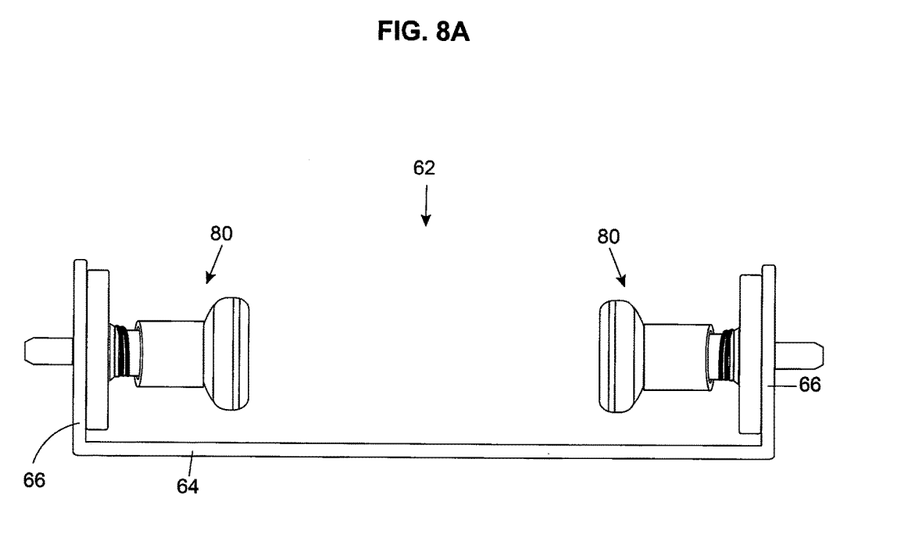
FIG. 8A is a rear view of the bracket assembly of FIG. 7 in a locked position.
Figure 8B:
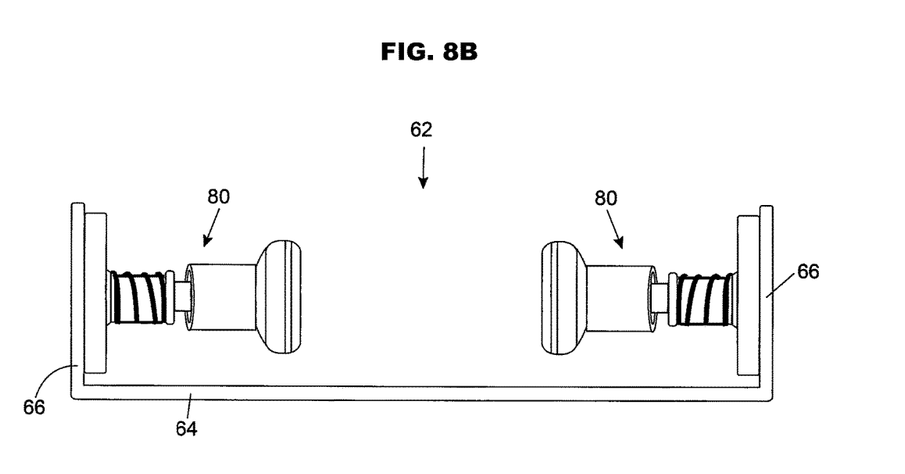
FIG. 8B is another rear view of the bracket assembly of FIG. 8A in an unlocked position.

FIG. 7 is an enlarged perspective view of the mounting bracket assembly 60 that attaches the rear side facing flanges 70 of the second platform 30 to the vertical frame 10 in a mounted lock position. FIG. 8A is a rear view of the U bracket 62 of the bracket assembly 60 of FIG. 7 in a locked position. FIG. 8B is another rear view of the U bracket 62 of the bracket assembly 60 of FIG. 8A in an unlocked position.

The first seat conversion system 1 can be installed by an installer into a vehicle, selected from trucks, vans, station wagons, sport utility vans (SUVs), and automobiles.

Referring to FIG. 1A, the seat conversion system 1 can include a seat foldable seat portion 20 (first platform) and removable vertical backrest 30 (second platform) that are attached to a vertical frame 10. The vertical frame 10 can include left vertical leg 12 and right vertical leg 14 that are mounted to a floor surface 96 inside of a vehicle, with a top portion mounted to an interior ceiling portion (not shown) inside of the vehicle. The vertical frame 10 can include an upper horizontal beam 16 above a lower horizontal beam 18 which extend between the vertical legs 12, 14.

Figure 9A:
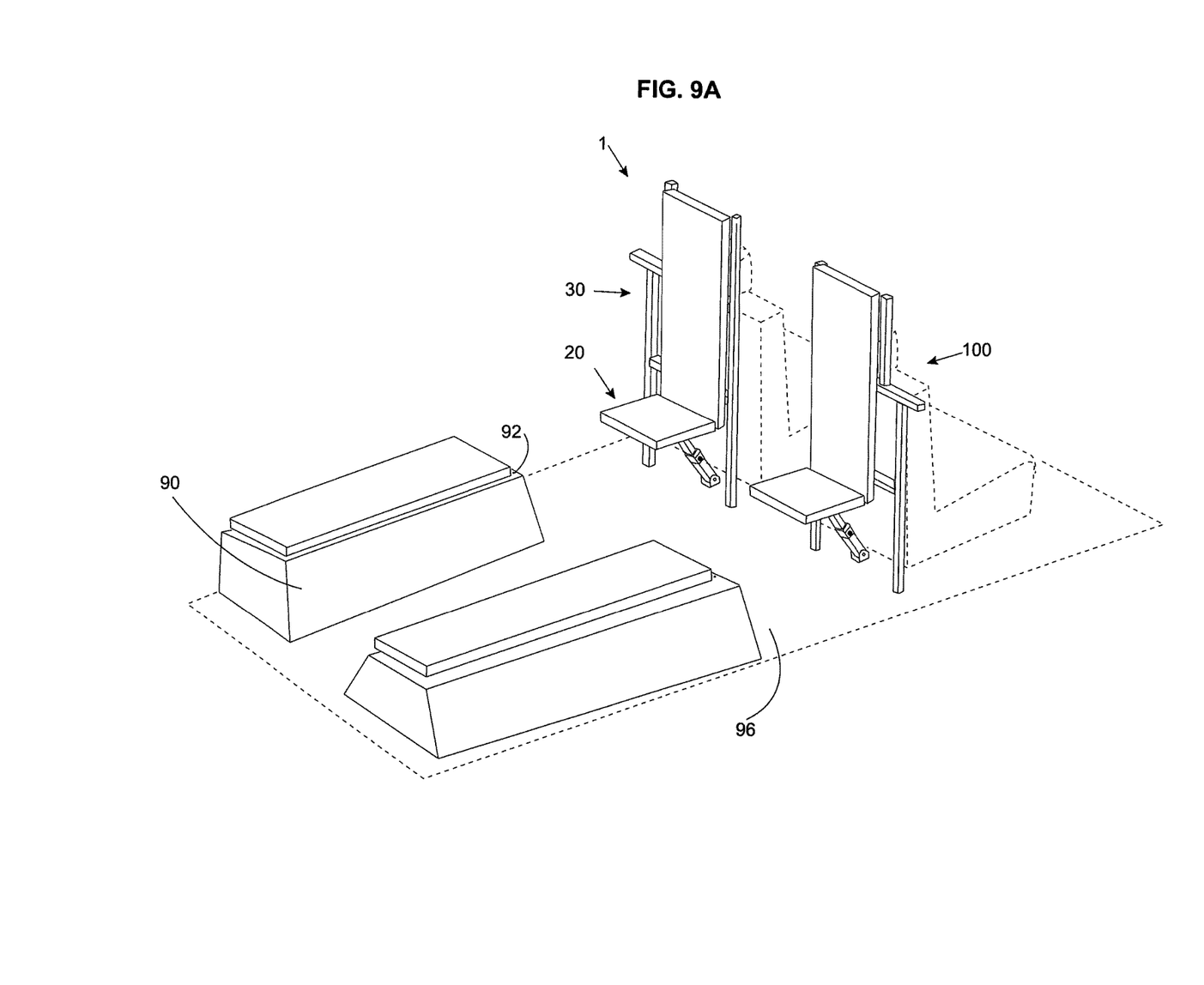
FIG. 9A is a perspective view of two seat conversion systems inside of a vehicle in jump seat configurations.

Once installed, the seat conversion system can initially have a jump seat configuration with a seat portion 20 and backrest 30, as shown in FIGS. 1A, 5A and 9A. The method and process steps of converting the system 1 from a jump seat configuration to a bench seat configuration will now be described.

Referring to FIGS. 4A-6B, the installer can start converting the jumper seat configuration into a bench seat configuration, by unlocking fastener 45. Fastener 45 can be a spring loaded knob fastener, which can be spring biased in an extended position, with a plunger extended outward, and retracts against a spring by rotating the knob and/or pulling the knob outward, which would retract the plunger. Such as rotatable spring loaded knob fastener can be such as but not limited to a Plate-Mount Retractable Spring Plunger, Part#8478A6, by McMaster-Carr Supply Company, Atlanta, Ga.

Such types of spring loaded knob fasteners are shown and described, in various patents, such as but not limited to U.S. Pat. No. 1,154,074 to Strong; U.S. Pat. No. 4,138,150 to Bills and U.S. Pat. No. 6,655,720 to Rampen, which are each incorporated by reference in their entirety. Other types of locking fasteners can be used, such as insertable and retractable L shaped latches, large bolts, screws, and the like, with or without turn knob ends as the bolt heads.

Once fastener 45 is moved to an unlock position, upper telescopic member 42 can slide into lower hollow telescopic member 44, as shown in FIGS. 5A-5C while the upper telescopic member 42 rotates against the bottom 28 of seat portion 20 by mounted upper pivot bracket 26, and the bottom of lower telescopic member 44 rotates against the floor 96 inside of a vehicle by lower floor mounted pivot bracket 48. The seat portion 20 folds downward from a horizontal orientation to be eventually generally against a lower portion of vertical frame 10 by hinges 40 that are mounted to both the seat bottom 28 and lower horizontal beam 18 on the vertical frame 10. The installer can push down on the top 26 of front end 22 which rotates relative to rear end 28 in order to fold the front seat portion 20 relative to the vertical frame 10.

After seat portion 20 is folded downward, the backrest 30 (second platform) is intended to be removed. Referring to FIGS. 1A, 3A, 4A, 4B. 7, 8A, 8B, a pair of L shaped brackets 70, 74 with rearwardly extending perpendicular flanges can be initially mounted to a rear side 38 of the backrest (second platform) 30 between the top end 34 and the bottom end 36. Additionally, a U-bracket 62 can be mounted to the vertical frame by having a horizontal member 64 mounted on top of the upper horizontal beam 16 of the vertical frame 10. Extending upward from the horizontal member 64 can be bent ends 66 each having through-holes therethrough. The backrest rear side 38 mounted L brackets 70, 74, with the vertical frame horizontal beam 16 mounted U bracket 62 together is a mounting bracket assembly 60.

Fasteners 80, can be similar to fastener 45 previously described. Fasteners 80 can each be a spring loaded knob fastener, which can be spring biased in an extended position, with a plunger extended outward, and retracts against a spring by rotating the knob and/or pulling the knob outward, which would retract the plunger. Such as rotatable spring loaded knob fastener can be such as but not limited to a Plate-Mount Retractable Spring Plunger, Part#8478A6, by McMaster-Carr Supply Company, Atlanta, Ga.

Such types of spring loaded knob fasteners 80 are shown and described, in various patents, such as but not limited to U.S. Pat. No. 1,154,074 to Strong; U.S. Pat. No. 4,138,150 to Bills and U.S. Pat. No. 6,655,720 to Rampen, which are each incorporated by reference in their entirety. Other types of locking fasteners can be used, such as insertable and retractable L shaped latches, large bolts, screws, and the like, with or without turn knob ends as the bolt heads.

When fasteners 80 are moved to an unlock position, backrest (second platform) 30 can be removed from a vertical orientation against vertical frame 10, and moved to a horizontal bench configuration.

Referring to FIGS. 1B, 2, 3A, 3B, 4B, 5C, 6A, 6B, on the left leg 14 of vertical frame 10 there can be a first L-bracket 50 mounted thereon. Bracket 50 can have a perpendicular flange portion with a through-hole therethrough. Rotatably mounted to the lower horizontal beam 18 between hinges 40 can be a hinge 58 for a second L bracket 56 that also has a perpendicular flange portion with a through-hole there through. Across the top end 34 and bottom end 36 on the rear side 38 of the second platform 30 can be male shaped fastener(s) 93 protruding outwardly.

When the second platform 30 is moved into a horizontal position, a set of male fasteners 93 can be positioned into the through-holes in the perpendicular flanges of the vertical frame mounted L brackets 50, 56. The opposite end of the second platform 30 can be placed on ledge 92 extending off of second vehicle mounted seat 90, and similarly held in place by male fasteners 93 mounted into female sockets (openings) 95 in the ledge 92.

The bench seat configuration can be moved back to a jump seat configuration by reversing the above process, and conversion method steps.

Figure 9B:
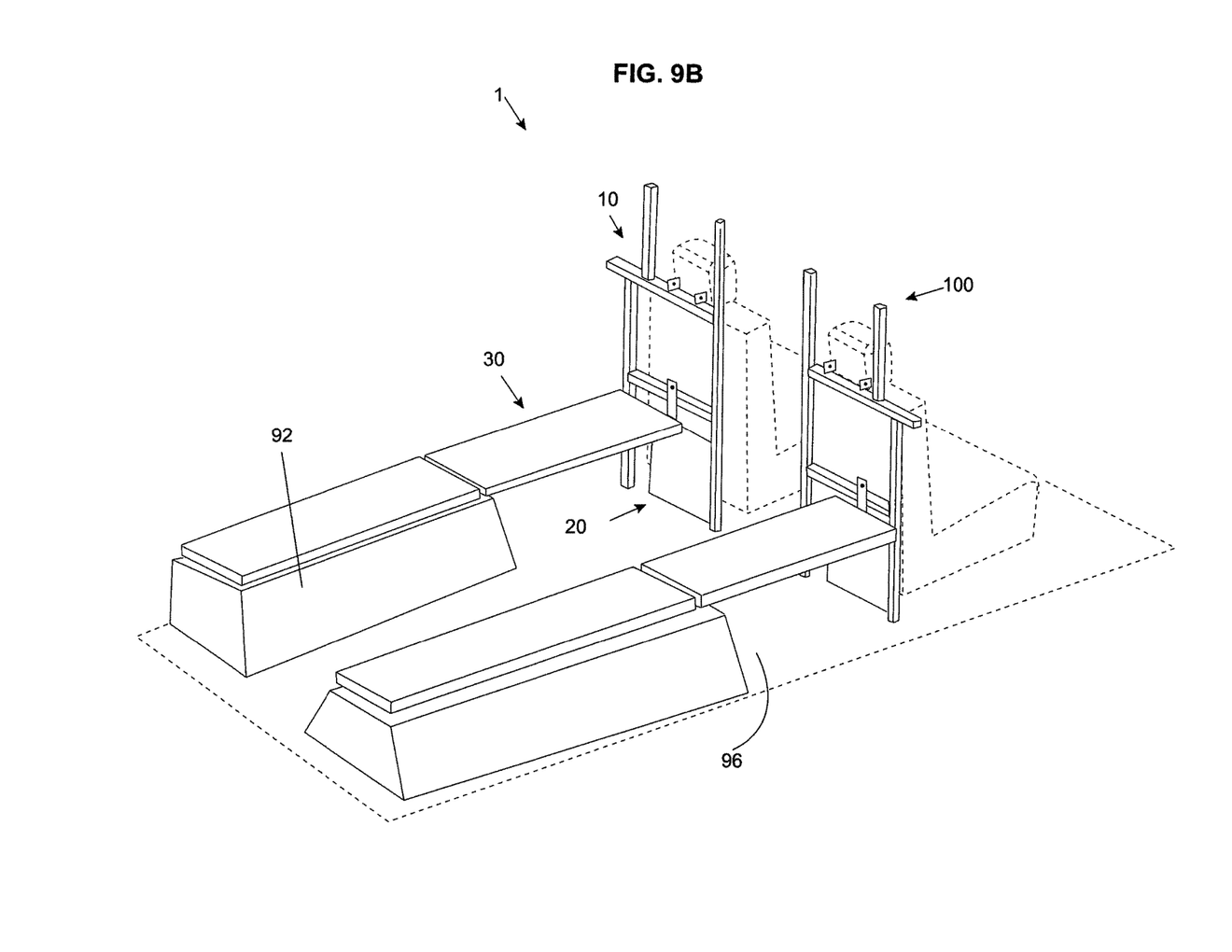
FIG. 9B is another perspective view of the seat conversion systems of FIG. 9A in bench seat configurations inside the vehicle.

FIG. 9A is a perspective view of two seat conversion systems 1 and 100 inside of a vehicle with the jump seat configuration initially attached to a vertical frame 1 (here two vertical frame(s) 1 are inside the vehicle. FIG. 9B is another perspective view of the seat conversion systems 1, 100 of FIG. 9A in bench seat configurations inside the vehicle. Converting from jump seat to bench seat configurations, can follow the steps shown and described in reference to FIGS. 1-8B, and the bench seat configurations can be converted back to jump seat configurations by reversing the steps.

The invention can be used with on seating arrangement being a jump seat configuration and the other in a bench seat configuration. Also the conversion systems can be mounted between the left and right sides inside of a vehicle as well as extending behind the front seats inside of the vehicle.

Although the preferred embodiments show and describe the invention for use inside of a vehicle the seat conversion systems can be used inside of other structures, such as but not limited to inside buildings, homes, and the like. Additionally, the seat conversion systems can be used in other applications, such as outdoors, and the like, both attached to vehicles, or not part of vehicles.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A seat conversion system for converting a vertical jump seat inside of a vehicle into a bench seat, comprising:
    a vertical frame adapted to attach to a floor surface inside of a vehicle;
    a first rectangular platform having a front side with a width and length, a rear side, a first end and a second end, the rear side being pivotally attached to the vertical frame, the front side adaptable for being used as a single jump seat inside of the vehicle when the first platform is in a horizontal orientation;
    a second rectangular platform having a front side with a width and length, a rear side, a first end and a second end, the front side width of the first platform being substantially identical to the front side width of the second platform, the front side length of the second platform being longer than the front side length of the first platform, the front side of the second platform adaptable for being used as a single seat back surface when the second platform is in a vertical orientation with the first end of the second platform adjacent to the second end of the first platform; and
    wherein the second platform is moveable from the vertical orientation to a horizontal orientation with the second end being supported at a lower position on the vertical frame, and the first end of the second platform is supported by a support member, the support member being horizontally spaced apart from the vertical frame so that the second platform in the horizontal orientation is used as a bench seat inside of the vehicle.

2. The seat conversion system of claim 1, further comprising:
    a pair of hinges, each attached to the vertical frame and to a portion of the rear side of the first platform, the hinges for allowing the first platform to pivotally move from the horizontal orientation to a folded orientation adjacent to the vertical frame.

3. The seat conversion system of claim 2, further comprising:
a telescoping post under the first platform located between the pair of the hinges, the telescoping post having an extended position when the first platform is in the horizontal orientation and a retracted position wherein the first platform is in a folded orientation.

4. The seat conversion system of claim 3, wherein the telescoping post includes:
an upper end with a first pivot bracket attached to the rear side of the first platform; and
a lower end with a second pivot bracket attached to a floor surface inside of the vehicle.

5. The seat conversion system of claim 1, further comprising:
a seat retainer bracket attached to the vertical frame, the seat retainer bracket positioned at a height above a floor surface; and
a ledge as the support member, the ledge being spaced horizontally apart from both the seat retainer bracket and the vertical frame, the ledge positioned at an identical height above the floor surface as the seat retainer bracket, wherein the second end and the first end of the rear side of the second platform are supported by the seat retainer bracket and the ledge when the second platform is in the horizontal orientation when the second platform is used as a bench seat.

6. The seat conversion system of claim 5, wherein the seat retainer bracket includes:
a pair of seat retainer brackets attached to the vertical frame.

7. The seat conversion system of claim 5, further comprising:
a fixed seat on the floor surface spaced apart from the vertical frame, wherein the ledge is an upper edge on the fixed seat.

8. The seat conversion system of claim 1, further comprising:
a bracket mounting assembly for attaching the rear side of the second platform to the vertical frame when the second platform is in the vertical orientation.

9. The seat conversion system of claim 8, wherein the bracket mounting assembly includes:
a first bracket attached to the vertical frame;
a second bracket attached to the rear side of the second platform; and
a fastener for locking the first bracket to the second bracket when the second platform is in the vertical orientation.

10. The seat conversion system of claim 9, wherein the first bracket includes a horizontal member with bent ends that form a U shape, with the horizontal member attached to the vertical frame, and the second bracket includes flanges perpendicularly attached to the rear side of the second platform, wherein the flanges of the second bracket lock with the bent ends of the first bracket by the fastener.

11. The seat conversion system of claim 10, wherein the fastener includes a pair of spring loaded fasteners having a compressed position which locks the first bracket to the second bracket, and an extended position which allows the second bracket to separate from the first bracket.

12. The seat conversion system of claim 11, wherein the spring loaded fasteners include knobs with stems having springs for holding the fasteners in the compressed position.

13. The seat conversion system of claim 8, further comprising:
an upper horizontal beam on the vertical frame, wherein the bracket mounting assembly is attached to the horizontal beam.

14. The seat conversion system of claim 13, further comprising:
a lower horizontal beam on the vertical frame; and
a hinge on the lower horizontal beam for pivotally attaching the rear side of the first platform to the vertical frame.

15. The seat conversion system of claim 14, wherein the hinge includes:
a pair of hinges, each attached to the lower horizontal beam on the vertical frame and to a portion of the rear end of the first platform, the hinges for allowing the first platform to pivotally move from the horizontal orientation to a folded orientation adjacent to the vertical frame.

16. The seat conversion system of claim 14, further comprising:
a seat retainer bracket attached to the lower horizontal beam on the vertical frame, the seat retainer bracket positioned at a height above a floor surface; and
a ledge spaced horizontally apart from both the seat retainer bracket and the vertical frame, the ledge positioned at an identical height above the floor surface as the seat retainer bracket, wherein the rear side of the second platform is supported by the seat retainer bracket and the ledge when the second platform is in the horizontal orientation when the second platform is used as a bench seat.

17. The seat conversion system of claim 16, wherein the seat retainer bracket includes:
a pair of seat retainer brackets attached to the lower horizontal beam on the vertical frame.

18. The seat conversion system of claim 1, further comprising:
a second vertical frame adapted to attach to a floor surface inside of a vehicle spaced apart from the first vertical frame;
a third rectangular platform having a front side with a width and length, a rear side, a first end and a second end, the rear side being pivotally attached to the second vertical frame, the front side adaptable for being used as a second single jump seat inside of the vehicle when the third platform is in a horizontal orientation;
a fourth rectangular platform having a front side with a width and length, a rear side, a first end and a second end, the front side width of the third platform being substantially identical to the front side width of the fourth platform, the front side length of the fourth platform being longer than the front side length of the third platform, the front side of the fourth platform adaptable for being used as a single seat back surface when the fourth platform is in a vertical orientation with the lower end of the fourth platform adjacent to the upper end of the third platform; and
wherein the fourth platform is moveable from the vertical orientation to a horizontal orientation with the upper end supported at a lower position on the second vertical frame, and the lower end of the fourth platform is supported by a second support member, the second support member being horizontally spaced apart from the second vertical frame member so that the fourth platform in the horizontal orientation is used as a second bench seat inside of the vehicle.

19. A seat conversion system for converting a jump seat inside of a vehicle into a bench seat, comprising:

a vertical frame for being mounted inside a vehicle;

a first rectangular platform having a front side with a width and length, a rear side, a first end and a second end, the second end being pivotally attached to the vertical frame, the front side adaptable for being used as a single jump seat inside of the vehicle when the first platform is in a horizontal orientation; and a second rectangular platform having a front side with a width and length, a rear side, a first end and a second end, the front side width of the first platform being substantially similar to the front side width of the second platform, the front side length of the second platform being longer than the front side length of the first platform, the front side of the second platform adaptable to be used as a seat back surface when the second platform is in a vertical orientation with the first end of the second platform adjacent to the second end of the first platform, wherein the second platform is moveable to a horizontal orientation with the second end being supported at a lower position adjacent to the vertical frame, and the first end of the second platform is supported away from the vertical frame so that the second platform in the horizontal orientation is used as a bench seat inside of the vehicle.

* * * * *